Nov. 9, 1926.
W. L. PITTS
1,606,260
LID HOLDER FOR STAVE OR SPLINT BASKETS OR HAMPERS.
Filed May 16, 1925
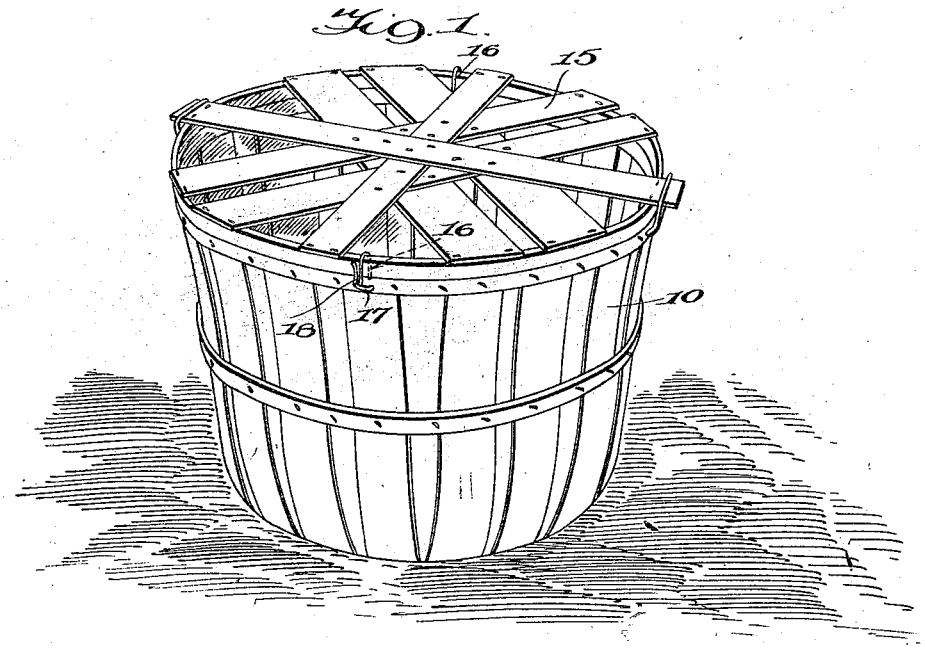
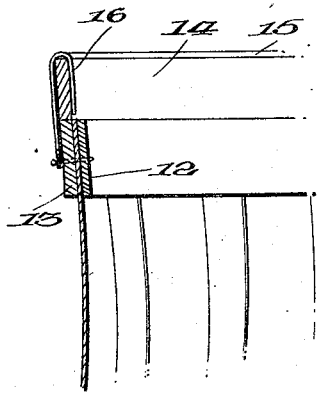
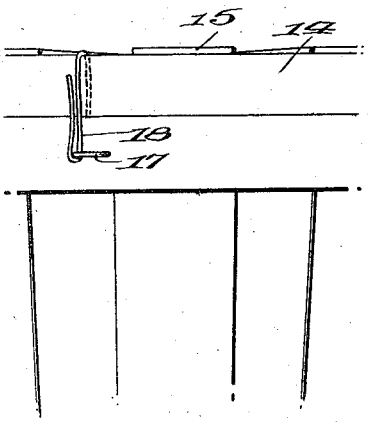
WITNESSES
INVENTOR
W. L. Pitts,
BY
ATTORNEYS Patented Nov. 9, 1926.

1,606,260

UNITED STATES PATENT OFFICE.

WILLIAM LELAND PITTS, OF MARSHALL, TEXAS.

LID HOLDER FOR STAVE OR SPLINT BASKETS OR HAMPERS.

Application filed May 16, 1925. Serial No. 30,803.

My present invention relates generally to round stave or splint baskets, commonly used for the transportation of fruits and vegetables in connection with a cover consisting of a rim having crossed splints or staves secured thereto in such manner as to afford ample space for ventilation of the fruit or vegetables within the basket and my object is the provision of a simple inexpensive holder or fastener for the lid in order that the latter may be prevented from accidental displacement as well as to avoid lifting of the cover and withdrawal of the contents by unwarranted persons in the easy manner in which this may be accomplished at the present time.

In the accompanying drawing which illustrates my present invention and forms a part of this specification, Figure 1 is a perspective view showing a basket illustrating my improvement, Figure 2 is a partial vertical section through one side of the basket, and, Figure 3 is a side view of a portion of the basket adjacent to one of the holders or fasteners.

Referring now to these figures and particularly to Fig. 1, I have shown a basket of the round stave or splint type in which the splints or staves 10 are extended upwardly in circumferential overlapping relation to form the wall of the basket and are confined in place by a center hoop or band 11 as well as by the secure connection of their upper ends between inner and outer rim bands 12 and 13 which together with the secured ends of the splints or staves form the upper edge of the basket.

The usual cover includes the rim band 14 to which the ends of crossed splints or staves 15 are secured, the staves being arranged as shown in Fig. 1, so as to leave ample space for ventilation of the contents of the basket. The cover rim 14, when the cover is in position, seats upon the upper edge of the body of the basket as above described and is ordinarily subject to the danger of displacements as well as the lifting by unwarranted hands, and to defeat ready displacement as well as lifting of the cover, my invention proposes holders or fasteners adapted for use at spaced points around the basket, each holder or fastener being of U-shape for extension downwardly over the rim band 14 of the cover as indicated at 16. One extension of this band engaging hook or fastener of the shape described, is of considerably greater length than the other and this longer extension is in practice projected downwardly upon the exterior of the upper edge of the basket body through a staple and the like 17 securely fastened and clinched through the rim bands 12 and 13 of the body. With the cover pressed downwardly and securely against the upper edge of the basket body, the longer extension 18 of the holder or fastener 16 is then, after passage through the staples 17 bent upwardly and backwardly upon itself in order that a secure lock may be completed.

The fastener as thus described is not only simple and inexpensive, but is well adapted for use at various and selected points around the basket in order to securely hold the rim with little addition to the cost of the usual lid holding rims.

I claim:

A releasable fastening device for use in securing covers to baskets and comprising an inverted U-shaped hook member separable from both the cover and the basket and adapted to be extended downwardly over and embrace the rim band of a cover and having its outer leg portion elongated with respect to its inner leg portion for projection downwardly beyond the cover and along the exterior of the upper portion of the basket body, and an anchoring member separate from and independent of the structure constituting the upper edge of the basket body and securely fastened to such structure, said anchoring member having a curved body portion projecting beyond the outer periphery of the upper edge of the basket body and adapted to slidably and snugly receive the elongated outer leg of the U-shaped hook member, said elongated leg being adapted to be bent upwardly around said curved body portion of said anchoring member and into engagement with the outer periphery of the upper edge of the basket whereby to lock the hook member to the anchoring member.

WILLIAM LELAND PITTS.